United States Patent
Kubena et al.

(10) Patent No.: US 11,747,512 B1
(45) Date of Patent: Sep. 5, 2023

(54) PHONONIC COMB ENHANCED MEMS GRAVITY GRADIOMETERS

(71) Applicant: HRL Laboratories, LLC, Malibu, CA (US)

(72) Inventors: Randall L. Kubena, Oak Park, CA (US); Logan D. Sorenson, Thousand Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 573 days.

(21) Appl. No.: 16/932,447

(22) Filed: Jul. 17, 2020

Related U.S. Application Data

(60) Provisional application No. 62/890,799, filed on Aug. 23, 2019.

(51) Int. Cl.
*G01V 7/00* (2006.01)
*G01V 7/04* (2006.01)

(52) U.S. Cl.
CPC ............. *G01V 7/005* (2013.01); *G01V 7/04* (2013.01)

(58) Field of Classification Search
CPC ................................ G01V 7/04; G01V 7/005
See application file for complete search history.

(56) References Cited

U.S. PATENT DOCUMENTS

| | | |
|---|---|---|
| 4,070,635 A | 1/1978 | Healey |
| 4,132,964 A | 1/1979 | Wilcox |

(Continued)

FOREIGN PATENT DOCUMENTS

| | | |
|---|---|---|
| KR | 10-2008-0044977 A | 5/2008 |
| KR | 10-2012-0132987 A | 12/2012 |

(Continued)

OTHER PUBLICATIONS

From U.S. Appl. No. 17/348,344 (unpublished, non-publication requested), Office Action dated Jan. 27, 2022.

(Continued)

*Primary Examiner* — Paul M. West
(74) *Attorney, Agent, or Firm* — Ladas & Parry, LLP

(57) ABSTRACT

A method and apparatus for for sensing a change in an acceleration gradient δa(t) between two gravity fields $a_1(t)$ and $a_2(t)$ respectively sensed by the first and second proof masses, the first and second proof masses either being coupled only to a first resonator or being individually coupled to first and second resonators, the first resonator generating, in use, a signal at a frequency $f_D$ which is applied said second resonator, the second resonator being driven, in use, into a non-linear state corresponding to a modal resonant frequency $f_\Theta$ wherein it generates a comb of frequencies each tooth of which is separated from each other by a frequency Δ which is frequency-wise proportional a frequency difference between $f_D$ and $f_\Theta$ and also proportional to the change in said acceleration gradient δa(t), circuitry for selecting an $n^{th}$ tooth in said comb of frequencies where the frequency of the $n^{th}$ tooth is equal to $f_D+n\Delta$, circuitry for detecting a change in the frequency of the $n^{th}$ tooth and for generating a signal that is proportional to n times the change in an acceleration gradient δa(t).

19 Claims, 5 Drawing Sheets

(56) References Cited

U.S. PATENT DOCUMENTS

| | | |
|---|---|---|
| 7,750,535 B2 | 7/2010 | Kubena |
| 7,851,971 B2 | 12/2010 | Chang |
| 8,601,607 B2 | 12/2013 | Hagmann |
| 8,765,615 B1 | 7/2014 | Chang |
| 8,994,465 B1 | 3/2015 | Kubena |
| 10,110,198 B1 | 10/2018 | Kubena |
| 10,389,392 B1 | 8/2019 | Kubena |
| 10,819,276 B1 | 10/2020 | Kubena |
| 11,156,897 B2 | 10/2021 | Kubena |
| 11,239,823 B1 | 2/2022 | Kubena |
| 2010/0321117 A1 | 12/2010 | Gan |
| 2012/0294319 A1 | 11/2012 | Maleki |
| 2015/0107357 A1* | 4/2015 | Hentz .................... G01D 5/268 73/382 G |
| 2017/0047893 A1 | 2/2017 | Nguyen |
| 2018/0157148 A1 | 6/2018 | Kim |
| 2019/0250198 A1 | 8/2019 | Kubena |
| 2020/0158769 A1 | 5/2020 | Liu |

FOREIGN PATENT DOCUMENTS

| | | |
|---|---|---|
| WO | 2014-018444 A2 | 1/2014 |
| WO | 2019/217668 A1 | 11/2019 |

OTHER PUBLICATIONS

From U.S. Appl. No. 16/932,455 (now published as U.S. Pat. No. 11,156,897), Notice of Allowance dated Jun. 23, 2021.
Haiti, et al., "Reducing oscillator PM noise from AM-PM noise correlation," Electronics letters 50.17 (2014): 1195-1197.
Howe, et al., "PM-AM correlation measurements and analysis,". May 2012, IEEE International Frequency Control Symposium Proceedings (pp. 1-5). IEEE.
"Phase Detector/Frequency Synthesizer: ADF4002 Data Sheet" Analog Devices 2006-2015, http://www.analog.com, pp. 1-20.
U.S. Appl. No. 16/932,427, filed Jul. 17, 2020, Kubena.
U.S. Appl. No. 16/932,431, filed Jul. 17, 2020, Kubena.
U.S. Appl. No. 16/932,455, filed Jul. 17, 2020, Kubena.
U.S. Appl. No. 15/965,652, filed Apr. 27, 2018, Kubena.
U.S. Appl. No. 16/370,602, filed Mar. 29, 2019, Kubena.
U.S. Appl. No. 16/512,091, filed Jul. 15, 2019, Sorenson.
U.S. Appl. No. 16/775,242, filed Jan. 28, 2020, Kubena.
Askari, S. et al., "Near-Navigation Grade Quad Mass Gyroscope With Q-Factor Limited by Thermo-Elastic Damping," Solid-State, Actuators, and Microsystems Workshop Technical Digest, Hilton Head, South Carolina, USA, 2016, pp. 254-257.
Bennett, S. P. et al., "Magnetic Field Response of Doubly Clamped Magnetoelectric Microelectromechanical AlN—FeCo Resonators," Applied Physics Letters 111, 252903 (2017).
Bhatia, A. et al., "Linearization of Phase-Modulated Analog Optical Links using a Four-Wave Mixing Comb Source," Optics Express, DOI: 10.1364/OE 22.030899, Dec. 4, 2014.
Chang, et al., "Nonlinear UHF Quartz MEMS Oscillator with Phase Noise Reduction," 26th IEEE International Conference on MicroElectroMechanical Systems, Taipei, Taiwan, Jan. 20-24, 2013, pp. 781-784.
Ganesan, A., et al., "Evidence for Simultaneous Growth and Saturation Mechanisms in Phononic Frequency Combs," IEEE, 2019 Frequency Control Symposium, Orlando, Fl. Apr. 14-18, 2019 (3 pages).
Ganesan, A., et al., "Phononic Frequency Combs for Engineering MEMS/NEMS Devices With Tunable Sensitivity," 2019 IEEE (4 pages).
Ganesan, A. et al., "Phononic Frequency Comb via Intrinsic Three-Way Mixing," Physical Review Letters, PRL 118, 033903 (2017), (5 pages).
Hui, Y. et al., High Resolution Magnetometer Based on a High Frequency Magnetoelectric MEMS-CMOS Oscillator, Journal of Micromechanical Systems, vol. 24, No. 1, Feb. 2015, pp. 134-143.
Kominis, et al., "A subfemtotesla multichannel atomic magnetometer," Nature, vol. 422, pp. 596-599 (2003).
Krishnamoorthy, U., et al., "In-plane MEMS-based Nano-g Accelerometer with Sub-wavelength Optical Resonant Sensor," Sensors and Actuators A: Physical, 145-146, Jul.-Aug. 2008, pp. 283-290.
Kubena, et al., "A Fully Integrated Quartz MEMS VHF TCXO," 2017 IEEE Frequency Control Symposium, Besancon, Fr., pp. 68-71, Jul. 2017.
Kubena, R. L., et al. "Phononic Comb Generation in High-Q Quartz Resonators", Applied Physics Letters, 116, 053501 (2020).
Nan, et.al., "Acoustically Actuated Ultra-Compact NEMS Magnetoelectric Antenna," Nature Communications, 8:296, DOI: 10.1038/s41467-017-00343-8 (2017), pp. 1-8.
Sheng, et al., "A Microfabricated Optically-Pumped Magnetic Gradiometer," Applied Physics Letters 110, 031106 (2017).
Veryaskin, A. "Gravity, Magnetic and Electromagnetic Gradiometry: Strategic Technologies in the 21st century", IOP ebooks, 2018 (57 pages).
Vrba, J., "SQUID Sensors: Fundamentals, Fabrication and Applications," edited by H. Weinstock, Kluwer Academic, Dordrecht, The Netherlands, 1996, p. 117.
Wang, S. et al., "A MEMS Resonant Accelerometer for Low-Frequency Vibration Detection," Sensors and Actuators A: Physical, 283, Nov. 2018, pp. 151-158.
WenJie, W. et al., "A Nano-g MEMS Accelerometer for Earthquake Monitoring," 19th Intern. Conf. on Solid-State Sensors, Actuators and Microsystems (Transducers), DOI 10.1109/Transducers 2017, pp. 599-602.
Yao, et. al., "Bulk Acoustic Wave-Mediated Multiferroic Antennas: Architecture and Performance Bound," IEEE Transactions on Antennas and Propagation, vol. 63, No. 8, Aug. 2015.
Zhai, J.., et. al., "Detection of Pico-Tesla Magnetic Fields using Magneto-Electric Sensors at Room Temperature," Applied Physics Letters, 88, 062510 (2006).
PCT International Search Report and Written Opinion from PCT/US2020/051863 dated Jan. 4, 2021.
PCT International Preliminary Report on Patentability (Chapter I) with Written Opinion from PCT/US2020/051863 dated Apr. 7, 2022.
From U.S. Appl. No. 16/932,455 (now published as US 2021-0091748), office action dated Apr. 22, 2021.

* cited by examiner

PHONONIC COMB ENHANCED MEMS GRAVITY GRADIOMETERS

CROSS REFERENCE TO RELATED APPLICATIONS

This application claims the benefit of U.S. Provisional Patent Application Ser. No. 62/890,799 filed 23 Aug. 2019 and entitled "Phononic Comb Enhanced MEMS Gravity Gradiometers" the disclosure of which is hereby incorporated herein by reference.

This application also claims the benefit of Provisional Patent Application Ser. No. 62/904,052 filed 23 Sep. 2019 and entitled "Enhanced Stability Oscillators using a Phononic Comb" the disclosure of which is hereby incorporated herein by reference.

This application is related to the technology disclosed in U.S. Provisional Patent Application Ser. No. 62/881,063 filed 31 Jul. 2019 and entitled "Magnetostrictive MEMS Magnetic Gradiometer" and its corresponding U.S. Non-Provisional patent application Ser. No. 16/932,427 filed on the same date as this application and also entitled "Magnetostrictive MEMS Magnetic Gradiometer", the disclosures of which are hereby incorporated herein by reference.

This application also is related to the technology disclosed in U.S. Provisional Patent Application Ser. No. 62/881,069, filed on filed 31 Jul. 2019 and entitled "Phononic Comb Enhanced Gradiometers" and to its corresponding Non-Provisional patent application Ser. No. 16/932,431, filed on the same date as this application and also entitled "Phononic Comb Enhanced Gradiometers", the disclosures of which are hereby incorporated herein by reference.

This technology is also related to the technology disclosed in U.S. patent application Ser. No. 16/512,091, filed 15 Jul. 2019 and entitled "A Navigational Grade Resonant Micro-ElectroMechanical Systems (MEMS) Accelerometer and Method of Operation", the disclosure of which is hereby incorporated herein by reference.

STATEMENT REGARDING FEDERALLY SPONSORED RESEARCH OR DEVELOPMENT

None.

TECHNICAL FIELD

This disclosure relates to phononic comb enhanced gravity gradiometers.

BACKGROUND

Gravity gradiometers have traditionally been fabricated using large mechanical systems weighing many kilograms, measuring several cubic feet in volume, and consuming many watts of power. These large systems can typically detect sub-ng (nano-'g', where g is the standard gravity acceleration defined as 9.80665 m/s$^2$) acceleration levels, but can only be used on large platforms such as fixed-wing aircraft, large satellites, or at stationary ground locations. However, over the past decade, MEMS-based low Size, Weight, and Power (SWaP) systems have been used on smaller platforms (e.g., cube sats and UAVs), but the performance is severely compromised. By using large cm-size proof masses, MEMS accelerometers can achieve thermal noise levels near or less than 1 ng/√Hz for high Q systems. See, for example, U. Krishnamoorthy, et al., "In-plane MEMS-based Nano-g Accelerometer with sub-wavelength Optical Resonant Sensor," *Sensors and Actuators A: Physical*, 145-146, July-August, 2008, pp. 283-290 and W. Wenjie, et al., "A Nano-g MEMS Accelerometer for Earthquake Monitoring," 19$^{th}$ *Intern. Conf. on Solid-State Sensors, Actuators and Microsystems (Transducers)*, DOI 10.1109/Transducers 2017.

In addition, by using resonant frequency shifting as the transduction method, very sensitive detection can be achieved. See S. Wang, et al., "A MEMS Resonant Accelerometer for Low-Frequency Vibration Detection," *Sensors and Actuators A: Physical*, 283, November, 2018, pp. 151-158.

By combining large, high Q proof masses, resonant frequency transduction, and frequency difference multiplication of ≥10× using a frequency comb, the MEMS-based gradiometers disclosed herein can enjoy improved noise floors in the range of 10-100 pg/√Hz. This is comparable to larger, heavier, and much more costly commercial systems. For a baseline of 10 cm, this would correspond to a gradiometer sensitivity of 1-10 E (Eotvos=1 pg/cm) which is commonly needed for sensitive gravity mapping. There are two effective ways to increase gradiometer sensitivity known in the prior art: increase the direct sensitivity of the fundamental sensor (an accelerometer in the case of gravity gradiometry) or increase the length of the baseline separating the two points of effective detection.

The present disclosure advances the art in both approaches by (1) enabling more sensitive MEMS accelerometers which can be physically separated by a large baseline and/or (2) by implementing a direct and very sensitive acceleration gradiometer with a possibly shorter baseline, but which intrinsically and structurally rejects common-mode acceleration fields to which it is exposed.

Commercial gravity gradiometer systems have a weight between 10-100 lbs, are several feet in dimensions, and consume many watts of power. Thus, they are impractical on small satellites or small UAVs. MEMS accelerometers have much smaller SWaP (Size, Weight and Power), but are limited in sensitivity to 1-10 ng/√Hz, which is several orders of magnitude higher than the larger commercial versions. See A. Veryaskin, "Gravity, Magnetic and Electromagnetic Gradiometry", IOP ebooks, Morgan & Claypool Publishers, 2018, p 1-16. Thus, there is a need to improve the sensitivity of MEMS accelerometers by several orders of magnitude for gravity gradiometer applications.

The use of low phase noise oscillator technology can dramatically improve the sensitivity of resonant devices. For example, in the document by S. Wang noted above, a MEMS resonant accelerometer was tested with a 13.8 µg sensitivity with a 5.8×10$^{-8}$ fractional frequency stability at 1 sec. If the fractional frequency stability were reduced to 1.0×10$^{-11}$ at 1 sec. (which is achievable with a good quartz VCXO), the acceleration noise floor would be reduced to 2 ng/√Hz. If phononic comb enhancements were also introduced to increase the phase detection sensitivity by a factor of 10, then 200 pg/√Hz sensitivity would be achievable if thermal noise of the proof mass is also reduced to this level.

The generation of high fidelity phononic frequency combs in quartz resonators was demonstrated at HRL Laboratories, LLC of Malibu, CA in 2019, the results of which are reported in a paper entitled "Phononic Comb Generation in High-Q Quartz Resonators", R. L. Kubena, et al., *Appl. Phys. Lett.* 116, 053501 (2020) which is attached hereto as Appendix A. Appendix A is incorporated herein by this reference thereto. Prior to that, the first phononic frequency combs ever demonstrated were in lower Q AlN resonators in 2017. See "Phononic Frequency Comb via Intrinsic Three- Wave Mixing," A. Ganesan, C. Do, and A. Seshia, *Phys. Rev. Lett.* 118, 033903 (2017), the disclosure of which is hereby incorporated herein by reference. As such, the investigation of the physics involved in the generation of these combs is ongoing, and applications have not been fully explored. The present disclosure describes the use of these combs for improving the sensitivity of accelerometers using a novel phase detection method. In addition, it also relies on the ability to integrate high Q, high frequency, resonators with large proof masses for acceleration detection with low thermal noise.

BRIEF DESCRIPTION OF THE INVENTION

In one aspect, the presently disclosed technology provides a gravity gradiometer for detecting a change in an acceleration gradient $\delta a(t)$, the gradiometer comprising:
  a. first and second piezoelectric type electromechanical resonators, each of the first and second piezoelectric type electromechanical resonators having a piezoelectric structure that mechanically resonates in use and each of which has first and second electrodes disposed on its resonating piezoelectric structure;
  b. a first proof mass mechanically coupled with the resonating piezoelectric structure of the first piezoelectric type electromechanical resonator and a second proof mass mechanically coupled with the resonating piezoelectric structure of the second piezoelectric type electromechanical resonator;
  c. a first oscillator circuit coupled with the electrodes disposed on the resonating piezoelectric structure of the first piezoelectric type electromechanical resonator, the first piezoelectric type electromechanical resonator resonating at a frequency $f_D$, and having an output providing a signal at said frequency $f_D$;
  d. the second piezoelectric type electromechanical resonator having a resonant mode at a frequency $f_\Theta$, frequency $f_\Theta$ being different than said frequency $f_D$;
  e. first circuitry for applying the signal at said frequency $f_D$ to one of the electrodes disposed on the resonating piezoelectric structure of the second piezoelectric type electromechanical resonator for causing the resonating piezoelectric structure of the second piezoelectric type electromechanical resonator to resonate with a comb of frequencies each tooth of the comb being separated from each other by a frequency $\Delta(t)$ a change in which corresponds to the change in the acceleration gradient $\delta a(t)$ in two gravity fields $a_1(t)$ and $a_2(t)$ respectively sensed by the first and second proof masses;
  f. second circuitry for selecting a $n^{th}$ tooth output by the other one of the electrodes disposed on the resonating piezoelectric structure of the second piezoelectric type electromechanical resonator, where the frequency of the $n^{th}$ tooth is equal to $f_D+n\Delta(t)$ and for detecting the change in frequency of the $n^{th}$ tooth using a PLL wherein a feedback error signal of the PLL is proportional to n times the change in the acceleration gradient.

In another aspect, the presently disclosed technology provides a gravity gradiometer comprising:
  a. first and second piezoelectric type electromechanical resonators, each of the first and second piezoelectric type electromechanical resonators having a piezoelectric structure that mechanically resonates in use and each of which has first and second electrodes disposed on its resonating piezoelectric structure;
  b. a first and second proof mass mechanically coupled with the resonating piezoelectric structure of the first piezoelectric type electromechanical resonator.
  c. a first oscillator circuit coupled with the electrodes disposed on the resonating piezoelectric structure of the first piezoelectric type electromechanical resonator, the first oscillator circuit coupled and the first piezoelectric type electromechanical resonator resonating at a frequency $f_D$, and having an output providing a signal at said frequency $f_D$;
  d. the second piezoelectric type electromechanical resonator having a resonate mode at a frequency $f_\Theta$, frequency $f_\Theta$ being different than said frequency $f_D$;
  e. first circuitry for applying the signal at said frequency $f_D$ to one of the electrodes disposed on the resonating piezoelectric structure of the second piezoelectric type electromechanical resonator for causing the resonating piezoelectric structure of the second piezoelectric type electromechanical resonator to resonate with a comb of frequencies each tooth of which is separated from each other by a frequency $\Delta(t)$ a change in which corresponds to a change in an acceleration gradient $\delta a(t)$ in two gravity fields $a_1(t)$ and $a_2(t)$ respectively sensed by the first and second proof masses;
  f. second circuitry for selecting an $n^{th}$ tooth output by the other one of the electrodes disposed on the resonating piezoelectric structure of the second piezoelectric type electromechanical resonator, where the frequency of the $n^{th}$ tooth is equal to $f_D+n\Delta(t)$ and for detecting the change in frequency of the $n^{th}$ tooth using a PLL wherein a feedback error signal of the PLL is proportional to n times the change in the acceleration gradient $\delta a(t)$.

In yet another aspect the presently disclosed technology provides a method of sensing a change in an acceleration gradient $\delta a(t)$ in two gravity fields $a_1(t)$ and $a_2(t)$ respectively sensed by the first and second proof masses, providing first and second resonators, the first and second proof masses either being coupled only to said first resonator or being individually coupled to said first and second resonators, the first resonator generating a drive signal at a frequency $f_D$ which is applied said second resonator, the second resonator being driven into a non-linear state corresponding to a modal resonant frequency $f_\Theta$ thereof, the frequency $f_D$ of the drive signal being spaced from the modal resonant frequency $f_\Theta$, the second resonator producing a comb of frequencies the teeth of which are each separated from each other by a frequency $\Delta(t)$ which changes in time with changes in the acceleration gradient, wherein $\Delta(t)$ is frequency-wise proportional to said acceleration gradient $\delta a(t)$, selecting an $n^{th}$ tooth in said comb of frequencies where the frequency of the $n^{th}$ tooth is equal to $f_D+n\Delta(t)$, detecting a change in the frequency of the $n^{th}$ tooth in a PLL wherein a signal produced by the PLL is proportional to a change in $n\Delta(t)$ and hence also proportional to n times said acceleration gradient $\delta a(t)$.

Preferably, a common mode signal that shifts both $f_D$ and $f_\Theta$, but where a difference between $f_D$ and $f_\Theta$ remains the same at an instant in time, is removed by an additional resonator in an additional PLL by detecting and subtracting out a shift in $f_D$.

In still yet another aspect the presently disclosed technology provides an apparatus for sensing a change in an acceleration gradient $\delta a(t)$ between two gravity fields $a_1(t)$ and $a_2(t)$ respectively sensed by the first and second proof masses, the apparatus including first and second resonators, the first and second proof masses either being coupled only to said first resonator or being individually coupled to said first and second resonators, the first resonator generating, in use, a signal at a frequency $f_D$ which is applied said second resonator, the second resonator being driven, in use, into a non-linear state corresponding to a modal resonant frequency $f_\Theta$ wherein it generates a comb of frequencies each separated from each other by a frequency $\Delta$ which is frequency-wise proportional a frequency difference between $f_D$ and $f_\Theta$ and also proportional to the change in said acceleration gradient $\delta a(t)$, circuitry for selecting an $n^{th}$ tooth in said comb of frequencies where the frequency of the $n^{th}$ tooth is equal to $f_D+n\Delta$, circuitry for detecting a change in the frequency of the $n^{th}$ tooth and for generating a signal that is proportional to n times the change in an acceleration gradient $\delta a(t)$.

In still yet another aspect the presently disclosed technology provides gravity gradiometer for detecting a gravity gradient, the gradiometer comprising at least two resonators and at least two proof masses, the at least two proof masses each being attached to one or both of said at least two resonators, a first one of said at least two resonators generating a drive signal at a frequency $f_D$, a second one of said at least two resonators having a resonant mode at a frequency $f_\Theta$, and, in use, generating a comb of frequencies in response to the magnitude and frequency $f_D$ of the drive signal, the comb of frequencies having teeth separated by a frequency difference $\Delta$, the frequency difference $\Delta$ being essentially equal to a frequency difference between $f_\Theta$ and $f_D$.

Preferably, the frequency difference between $f_\Theta$ and $f_D$ is related to said gravity gradient, and wherein a sensitivity of detecting said gravity gradient is enhanced by selecting an $n^{th}$ tooth in said comb of frequencies, where n is greater than one, the $n^{th}$ tooth having a frequency equal to $f_D \pm n\Delta$, circuitry for subtracting out a common mode frequency change $\delta f_D$ from the change in the frequency of the tooth so that an absolute value of a resulting frequency shift of the $n^{th}$ tooth corresponds to n times the gravity gradient.

BRIEF DESCRIPTION OF THE DRAWINGS

FIG. 4(a) presents an overview of accelerometer device showing locations of applied DC bias voltages; FIG. 4(b) is zoom-in view of lower right corner of FIG. 4(b) showing proof mass, release holes, electrodes, springs, stopper, and anchor locations; and FIG. 4(c) is cross-sectional view showing how the quartz resonator may be attached to the proof masses in the (top) second embodiment (FIG. 3) and (bottom) first embodiment (FIG. 2), respectively.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Figure 1:
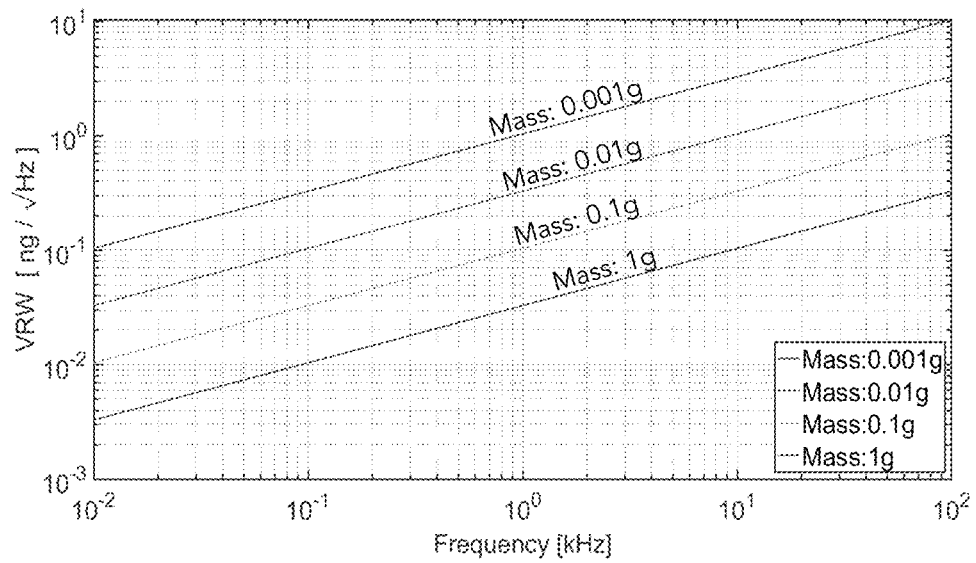
FIG. 1 depicts a Velocity Random Walk (VRW) (noise floor) scaling of an accelerometer assuming Q=1 million for various proof masses and resonant frequencies.

There are several issues that are desirously addressed in order to detect low intensity accelerations for gravity gradiometer mapping. The first is maintaining low thermal noise of a proof mass. This can be accomplished using a large and high Q proof mass with a low resonant frequency as shown in FIG. 1. For a resonant frequency of 100 Hz, the proof mass should be at least 100 milligrams for a Q of 1 million in order to maintain the thermal noise induced Velocity Random Walk (VRW) to ≤100 pg/√Hz, where g equals 9.8 m/sec². Such masses can be obtained, for example, by silicon proof mass structures alone or impregnated with heavy metals such as tungsten, gold, or platinum. So the proof masses have a relatively low resonant frequency (such the 100 Hz frequency noted above), but higher frequency resonators (to which the proof masses are coupled) are used to detect frequency shifts relative to a nonlinear comb element. These higher frequency resonators have a relatively very small mass and can work at UHF (300 MHz to 3 GHz), for example.

Q factors over 1 million have been demonstrated for silicon structures with frequencies <2 kHz (see S. Askari, et al., "Near-Navigation Grade Quad Mass Gyroscope With Q-Factor Limited By Thermo-Elastic Damping," in 2016

*Solid-State, Actuators, and Microsystems Workshop Technical Digest*, Hilton Head, South Carolina, USA, 2016, pp. 254-257, the disclosure of which is hereby incorporated herein by reference). This is because the thermoelastic dissipation of silicon is small at these frequencies.

Second, the transduction method desirously transduces the motion of the proof mass into an electrical signal with a low noise floor. Resonant frequency shifts are known to allow low noise transduction compared to other techniques such as capacitive transduction, especially if a low noise oscillator technology is utilized. Using a VCXO quartz-based oscillator technology, fractional frequency deviations of $10^{-11}$ are fairly easily detected between 1-10 Hz. Within a classical Phase Locked Loop (PLL), mHz frequency deviations can be detected for UHF resonators. Since a frequency comb can increase the sensitivity to the input frequency deviations seen by the PLL by a factor of $\geq 10$ times, for example, combining the two technologies can potentially provide $\leq 10^{-12}$ fractional frequency detection, on par with a good fixed frequency Oven Controlled Crystal Oscillator (OCXO) reference frequency.

An important idea here is to couple the stress induced from a low frequency proof mass with a low thermal noise into a higher frequency resonator whose resonant frequency is highly sensitive to this stress, and then use the resulting frequency shift in conjunction with a nonlinear element which produces the phononic frequency comb, to improve the frequency shift sensitivity (by roughly 10×) of a phase-lock-loop (PLL) detection scheme. Since the frequency noise of the higher frequency resonator can be minimized by using high-Q, temperature-compensated AT-cut quartz resonators, this technique has the advantage of lowering the noise floor of the acceleration detection element while enhancing the sensitivity of the resulting frequency shifts.

Figure 2:
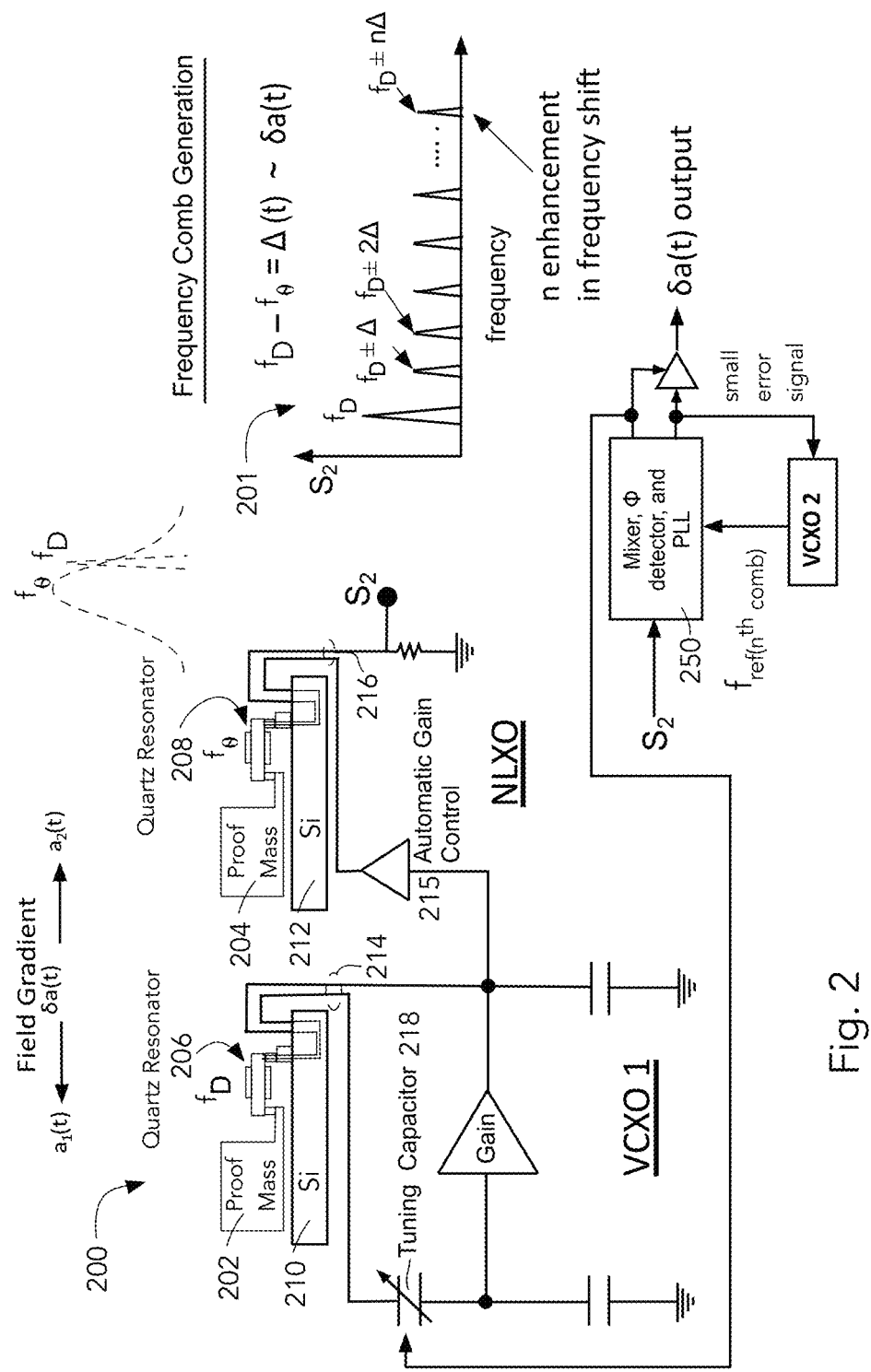
FIG. 2 depicts a MEMS comb enhanced gravity gradiometer in which the baseline of the gradiometer can be changed arbitrarily, the baseline of the gradiometer corresponding to the distance between proof masses. A PLL is used to select a desired nth tooth for enhanced detection.
Figure 2A:
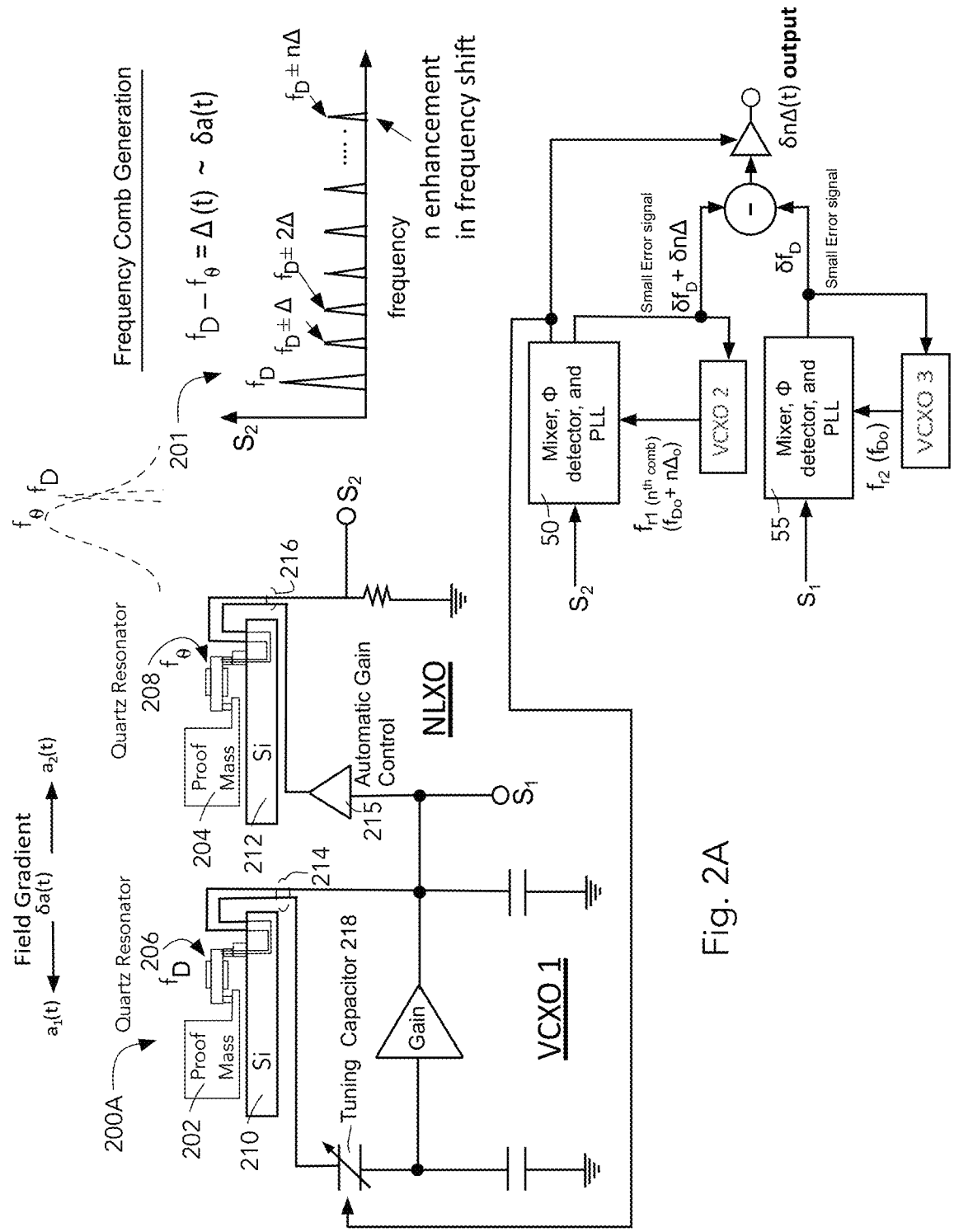
FIG. 2A depicts a MEMS comb enhanced gravity gradiometer similar to the embodiment of FIG. 2, but has a more robust PLL arrangement for both selecting a desired nth tooth for enhanced detection and also for counteracting common mode field signals.
Figure 3:
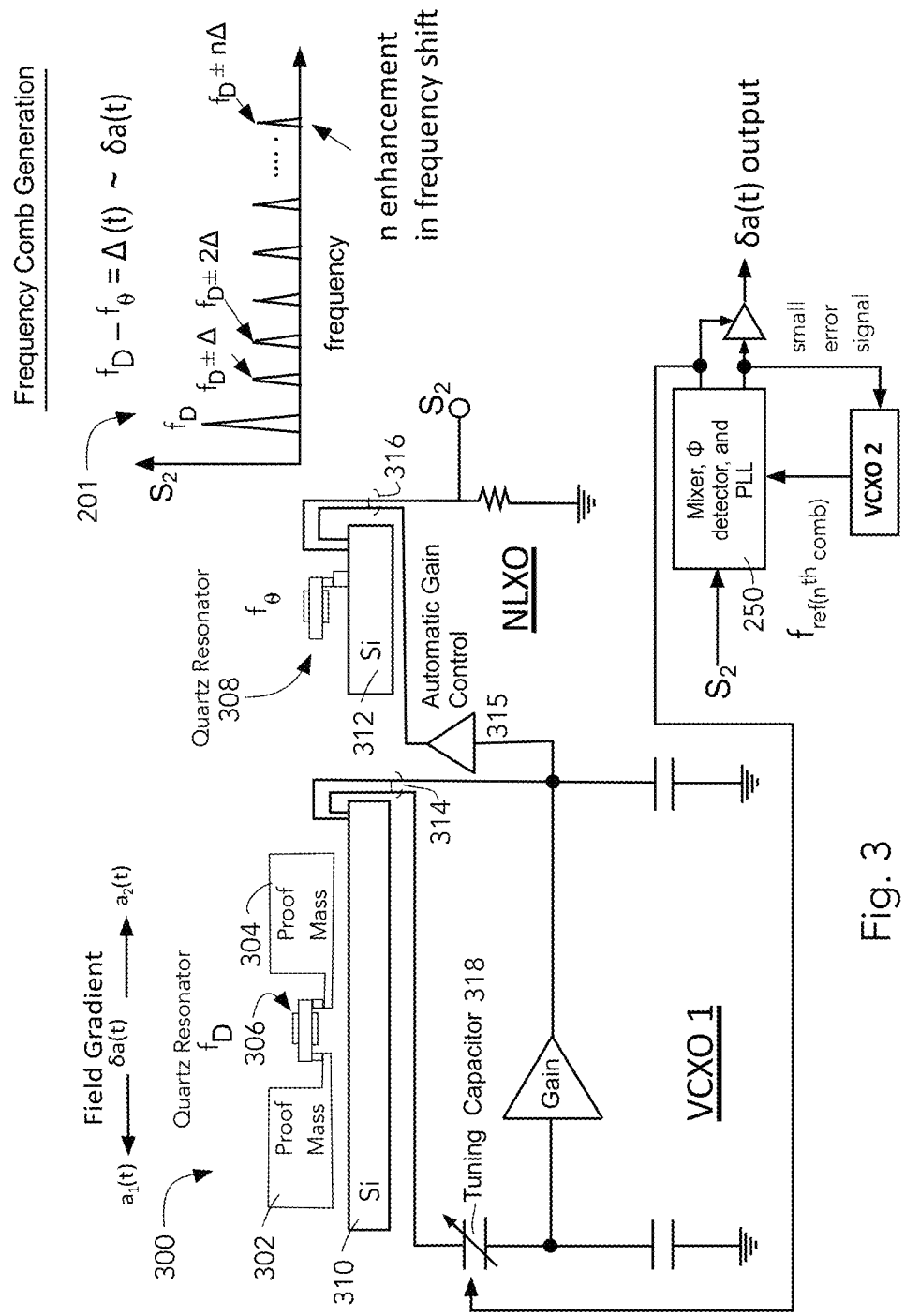
FIG. 3 depicts an integrated comb enhanced gravity gradiometer in which the proof masses are bonded to a single resonator and can move in a common motion on a common substrate. Thus, the acceleration gradient is sensed directly by the first resonator.

Three embodiments 200, 200A and 300 of a comb enhanced gravity gradiometer are presented in FIGS. 2, 2A and 3 respectively. In the embodiments 200 and 200A of FIGS. 2 and 2A the various elements thereof have element numbers in the range of 202-298. In the embodiment 300 of FIG. 3 the various elements thereof have element numbers in the range of 302-398 and where the elements are functionally similar to counterpart elements in the embodiment of FIG. 2 they may be similarly numbered (with a number one hundred higher than the functionally similar element of FIG. 2 or 2A).

In FIGS. 2 and 2A, two large proof masses 202 and 204 are bonded with two separate UHF quartz electromechanical resonators 206 and 208 which, in turn, are disposed on respective substrates 210 and 212. For example, a 100 milligrams proof mass (as is mentioned above) that is 200 μm thick, then the proof mass would have a size of about 1.5×1.5 cm on a side. In comparison, UHF resonators would be very much smaller, so the proof masses are large in comparison thereto.

The substrates 210, 212 are desirously formed of a semiconductor material (such as silicon) and the circuitry shown in FIG. 2 or 2A is desirously embodied in those substrates. The electrical connections between the circuitry in substrates 210, 212 come thru vias and/or via bonding regions on the bottom sides of the quartz resonators 206, 208 and connect thereby to the electrodes depicted on top and bottom surfaces of the quartz resonators 206, 208. At the opposite ends of the quartz resonators 206, 208 bond pads may be used to connect the inertial masses 202, 204 to their respective quartz resonators 206, 208 as is shown in the FIGS. 2 and 2A.

The first electromechanical resonator 206 is included within a voltage controlled oscillator (VCXO 1) sustaining circuit to produce a drive signal at $f_D$. The output of the oscillator VCXO 1 is amplified, for example, with an automate gain control (AGC) circuit 215 to drive the second electromechanical resonator 208 in non-linear comb generator NLXO into a nonlinear response near one of its modal frequencies, $f_\theta$. Typically the second electromechanical resonator 208 will have multiple resonant modes and at least one of those resonant modes (a selected mode at the frequency $f_\theta$) will produce a comb when driven sufficiently hard, for example, by the AGC circuit 215. By driving the second electromechanical resonator 208 at a frequency $f_D$ slightly offset from frequency $f_\theta$ of the selected mode in resonator 208, the second electromechanical resonator 208 produces the desired phononic comb (seen at numeral 201) with the teeth spacings being closely equal to the frequency difference $(f_D - f_\theta)$ between the two resonators 206, 208. The teeth of the comb may appear both above and below frequency $f_\theta$. A second resonator VCXO 2 and optionally a third resonator VXCO 3 (see the embodiment of FIG. 2A) are then used, preferably in a phase locked loop (PLL) configuration, to monitor the frequency stability of an $n^{th}$ tooth. The $n^{th}$ tooth is selected using filters in the PLL 250 and by selecting the frequency of VCXO 2 to mix with the $n^{th}$ tooth. In the alternative embodiment of FIG. 2A, a common mode signal that shifts both $f_D$ and $f_\theta$ (where the difference stays the same) is removed by the optional third VCXO 3 in a PLL 255 by detecting and subtracting out a shift in $f_D$. Since the $n^{th}$ tooth instability is increased by n compared to the original frequency difference between the first two resonators 206, 208, the detection sensitivity is improved in the embodiment of FIG. 2A compared to the classical PLL arrangement 250 as shown in the embodiment of FIG. 2.

A UHF resonator is preferred for resonators 206 and 208 since it is highly sensitive to strains and provides the PLL of VCXO 2 circuit with many cycles for detecting phase errors. A range adjust signal may be sent to the tuning capacitor (which may be embodied as varactor diode) 218 (located within the first VCXO 1 circuit) to adjust the comb settings to maintain a large dynamic range, in which case the voltage applied to the tuning capacitor 218 would be stepped to provide a larger dynamic range than the comb itself can provide without a scale factor adjustment. In the embodiments of FIGS. 2 and 2A, the baseline of the gradiometer (the distance or spacing between the proof masses 202 and 204) can be set arbitrarily. Also, while quartz UHF resonators are preferred for the various resonators, non-quartz and/or non-UHF resonators may be used instead, should that be desired.

The circuits of the VCXO 1 and VCXO 2 are preferably embodied in as integrated circuits in substrates 210 and 212 and in their respective connections 214 and 216 to the electrodes on the quartz bars of resonators 206 and 208. Those connections 214 and 216 are depicted as going through substrates 210 and 212, it being understood that if the circuits of VCXO 1 and VCXO 2 are embodied in substrates 210 and 212, then those connections 214 and 216 would then originate from those circuits in those respective substrates 210 and 212. In order to embody the circuits of VCXO 1 and VCXO 2, substrates 210 and 212 are preferably formed of a semiconductor material such as Si. The two substrates 210 and 212 may be replaced by a single substrate, but that will tend to limit the distance by which the two resonators 206, 208 can be separated from each other.

Another embodiment is shown in FIG. 3. In this embodiment, the two proof masses 302 and 304 are bonded a single, preferably high Q, quartz resonator 306 for detecting a differential acceleration between the two masses 302 and 304 using VCXO 1. This prevents the resonator 306 from reaching its frequency shift limit due to a large common-mode signal. In this embodiment, the third VCXO 3 the embodiment of FIG. 2A is not needed to counteract a common mode signal, since the common-mode signal on the two proof masses is inherently removed by the differential stresses applied to the resonator 306. The frequency of the second resonator 308 is not affected by a gradient in the acceleration signal.

The Qs of the resonators 206, 208 and 306, 308 in these embodiments should preferably be "high" and a "high" Q for an UHF resonator is preferably at least 10,000 and more preferably on the order of $10^5$. And while AT-cut quartz UHF resonators are preferred for the various resonators, non-quartz and/or non-UHF resonators (such as HF or VHF resonators) may be used instead, should that be desired. The resonators are attached to substrates 210, 212, 310 or 312 typically with bond metal (see FIG. 4, for example) and the various substrates 210, 212, 310 or 312 are typically a semiconductor substrate (such as silicon, for example) in which the circuitry of FIG. 2, 2A or 3 may be formed.

There is a range in which the frequency difference in the drive and the modes in the nonlinear element can produce a comb. If a common mode signal is large, the comb could be pushed in frequency beyond its operating limit for first embodiment of FIG. 2. However, for embodiment of FIG. 3, the UHF resonator 306 is only stressed by the difference in the motion between the two proof masses 302 and 304, so the comb is only responding to gradients in the acceleration (usually small), not the absolute common-mode acceleration. And in the embodiment of FIG. 2A, the absolute common mode acceleration signal is counteracted by the more robust PLL circuit used in that embodiment. It should now be evident to those skilled in the art, that the more robust PLL loop arrangement of FIG. 2A could be used with the resonators of FIG. 3 where the two proof masses 302 and 304 are bonded to a single quartz resonator 306.

The frequency shift, $\delta f_D$, is directly proportional to the sensed acceleration gradient in the embodiment of FIG. 3, for example. This modulated signal $f_D$ is then amplified and applied to the second fixed frequency resonator NLXO in a fashion similar to that in the first embodiment of FIG. 2 wherein the NLXO generates a frequency comb as depicted at numeral 201 from which an $n^{th}$ tooth is selected as in the prior embodiments. Generally speaking, a higher value of n results in a n times enhancement in the frequency shift of the selected tooth. That enhancement improves the noise floor of the embodiments 200, 200A and 300 of gravity gradiometer.

By using temperature compensated quartz resonators located on the same substrate and in a common vacuum housing, temperature induced fractional differential frequency drifts between the resonators can be minimized ($<10^{-7}$ over limited temperature ranges) with embodiment of FIGS. 2 and 2A if long baselines are not required. However, if long baselines are required, the above embodiments may suffer from larger temperature drifts if the two resonators are located on separate substrates. Alternately, the housing(s) can include a heater to ovenize the resonators to further reduce temperature induced differential frequency drifts ($<10^{-9}$ over limited temperature ranges) at the expense of slightly higher power.

The resonators in the embodiments of FIGS. 2, 2A and 3 are preferably all formed with quartz vibrating bars or members, but it is certainly possibly to utilize materials other than quartz for the vibrating bars or members in these resonators, if desired. The letter 'X' in VCXO1 and VCXO2 connotes that a crystalline piezoelectric material (quartz, for example) resonator is preferred, but non-crystalline piezoelectric materials may alternatively be used in some or all of the various electromechanical resonators if desired. All resonators in these embodiments preferably operate at UHF and have high Qs, for example, Qs on the order of 10,000 and more preferably on the order of 100,000. In addition, the PLLs could be designed in digital electronics using front-end Analog-to-Digital Converters (ADCs). This would give some flexibility in signal processing but possibly at the expense of added noise and power requirements.

Figure 4A:
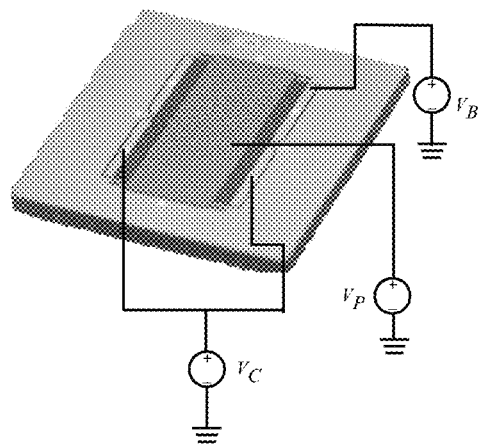
FIGS. 4(a)-4(c) depict a prototype silicon (Si) MEMS single proof mass accelerometer design where
Figure 4B:
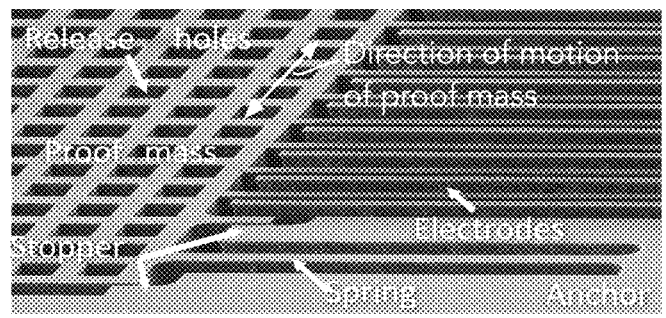
Figure 4C:
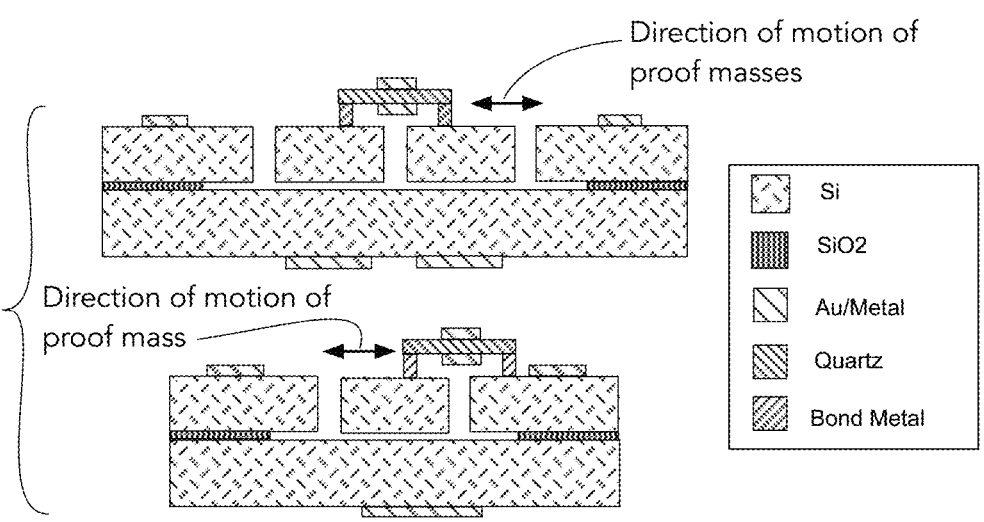

FIGS. 4(a)-4(c) depict a prototype silicon (Si) MEMS single proof mass accelerometer design where FIG. 4(a) presents an overview of accelerometer device showing locations of applied DC bias voltages; FIG. 4(b) is a zoom-in view of the lower right corner of FIG. 4(a) showing proof mass, release holes, electrodes, springs, stopper, and anchor locations; and FIG. 4(c) is cross-sectional view showing how the quartz resonator may be attached to the proof masses in the (top) second embodiment case (FIG. 3) and (bottom) first embodiment case (FIG. 2), respectively. For additional information regarding that which is shown in FIG. 4, the readers attention is directed to U.S. patent application Ser. No. 16/512,091, filed 15 Jul. 2019 and entitled "A Navigational Grade Resonant MicroElectroMechanical Systems (MEMS) Accelerometer and Method of Operation" noted above.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A gravity gradiometer for detecting a change in an acceleration gradient δa(t), the gradiometer comprising:
   a. first and second piezoelectric type electromechanical resonators, each of the first and second piezoelectric type electromechanical resonators having a piezoelectric structure that mechanically resonates in use and each of which has first and second electrodes disposed on its resonating piezoelectric structure;
   b. a first proof mass mechanically coupled with the resonating piezoelectric structure of the first piezoelectric type electromechanical resonator and a second proof mass mechanically coupled with the resonating piezoelectric structure of the second piezoelectric type electromechanical resonator;
   c. a first oscillator circuit coupled with the electrodes disposed on the resonating piezoelectric structure of the first piezoelectric type electromechanical resonator, the first piezoelectric type electromechanical resonator resonating at a frequency $f_D$, and having an output providing a signal at said frequency $f_D$:
   d. the second piezoelectric type electromechanical resonator having a resonant mode at a frequency fΘ, frequency fΘ being different than said frequency $f_D$:
   e. first circuitry for applying the signal at said frequency $f_D$ to one of the electrodes disposed on the resonating piezoelectric structure of the second piezoelectric type electromechanical resonator for causing the resonating piezoelectric structure of the second piezoelectric type electromechanical resonator to resonate with a comb of frequencies each tooth of the comb being separated from each other by a frequency Δ(t) a change in which corresponds to the change in the acceleration gradient δa(t) in two gravity fields $a_1(t)$ and $a_2(t)$ respectively sensed by the first and second proof masses;
   f. second circuitry for selecting a $n^{th}$ tooth output by the other one of the electrodes disposed on the resonating piezoelectric structure of the second piezoelectric type electromechanical resonator, where the frequency of the $n^{th}$ tooth of the comb is equal to $f_D+n\Delta(t)$ and for detecting the change in frequency of the $n^{th}$ tooth using a PLL wherein a feedback error signal of the PLL is proportional to n times the change in the acceleration gradient.

2. The gravity gradiometer of claim 1 wherein said first and second piezoelectric type electromechanical resonators are disposed on a common substrate.

3. The gravity gradiometer of claim 2 wherein the common substrate is a semiconductor substrate and said first circuitry is at least partially formed in or on said semiconductor substrate.

4. The gravity gradiometer of claim 1 wherein said first and second piezoelectric type electromechanical resonators are disposed on separate, spaced apart substrates.

5. The gravity gradiometer of claim 1 wherein the first circuitry includes an automatic gain circuit.

6. The gravity gradiometer of claim 1 wherein the electromechanical resonators have quartz resonating structures and are preferably of a UHF type having Qs of at least $10^5$.

7. A gravity gradiometer comprising:
   a. first and second piezoelectric type electromechanical resonators, each of the first and second piezoelectric type electromechanical resonators having a piezoelectric structure that mechanically resonates in use and each of which has first and second electrodes disposed on its resonating piezoelectric structure;
   b. a first and second proof mass mechanically coupled with the resonating piezoelectric structure of the first piezoelectric type electromechanical resonator;
   c. a first oscillator circuit coupled with the electrodes disposed on the resonating piezoelectric structure of the first piezoelectric type electromechanical resonator, the first oscillator circuit coupled and the first piezoelectric type electromechanical resonator resonating at a frequency $f_D$, and having an output providing a signal at said frequency $f_D$:
   d. the second piezoelectric type electromechanical resonator having a resonate mode at a frequency fΘ, frequency fΘ being different than said frequency $f_D$:
   e. first circuitry for applying the signal at said frequency $f_D$ to one of the electrodes disposed on the resonating piezoelectric structure of the second piezoelectric type electromechanical resonator for causing the resonating piezoelectric structure of the second piezoelectric type electromechanical resonator to resonate with a comb of frequencies each tooth of which is separated from each other by a frequency Δ(t) a change in which corresponds to a change in an acceleration gradient δa(t) in two gravity fields $a_1(t)$ and $a_2(t)$ respectively sensed by the first and second proof masses;
   f. second circuitry for selecting an $n^{th}$ tooth output by the other one of the electrodes disposed on the resonating piezoelectric structure of the second piezoelectric type electromechanical resonator, where the frequency of the $n^{th}$ tooth is equal to $f_D+n\Delta(t)$ and for detecting the change in frequency of the $n^{th}$ tooth using a PLL wherein a feedback error signal of the PLL is proportional to n times the change in the acceleration gradient δa(t).

8. The gravity gradiometer of claim 7 wherein the first circuitry includes an automatic gain circuit.

9. The gravity gradiometer of claim 7 wherein the electromechanical resonators have quartz resonating structures and are preferably of a UHF type having Qs of at least $10^5$.

10. A method of sensing a change in an acceleration gradient δa(t) in two gravity fields $a_1(t)$ and $a_2(t)$ respectively sensed by first and second proof masses, the method comprising providing first and second resonators; said first and second proof masses either being coupled only to said first resonator or being individually coupled to said first and second resonators, the first resonator generating a drive signal at a frequency $f_D$ which is applied said second resonator, the second resonator being driven into a non-linear state corresponding to a modal resonant frequency fΘ thereof, the frequency $f_D$ of the drive signal being spaced from the modal resonant frequency fΘ, the second resonator producing a comb of frequencies the teeth of which are each separated from each other by a frequency Δ(t) which changes in time with changes in the acceleration gradient, wherein Δ(t) is frequency-wise proportional to said acceleration gradient δa(t), selecting an $n^{th}$ tooth in said comb of frequencies where the frequency of the $n^{th}$ tooth is equal to $f_D+n\Delta(t)$, detecting a change in the frequency of the $n^{th}$ tooth in a PLL wherein a signal produced by the PLL is proportional to a change in $n\Delta(t)$ and hence also proportional to n times said acceleration gradient $\delta a(t)$.

11. The method of claim 10 wherein the value of n is greater than 1.

12. The method of claim 10 wherein a common mode signal that shifts both $f_D$ and $f\Theta$ is removed by an additional resonator in an additional PLL by detecting and subtracting out the shift caused by the common mode signal.

13. An apparatus for sensing a change in an acceleration gradient $\delta a(t)$ between two gravity fields $a_1(t)$ and $a_2(t)$ respectively sensed by First and second proof masses, the apparatus including first and second resonators; said first and second proof masses either being coupled only to said First resonator or being individually coupled to said first and second resonators, the first resonator generating, in use, a signal at a frequency $f_D$ which is applied said second resonator, the second resonator being driven, in use, into a non-linear state corresponding to a modal resonant frequency $f\Theta$ wherein it generates a comb of frequencies each tooth of which is separated from each other by a frequency $\Delta$ which is frequency-wise proportional a frequency difference between $f_D$ and $f\Theta$ and also proportional to the change in said acceleration gradient $\delta a(t)$, circuitry for selecting an $n^{th}$ tooth in said comb of frequencies where the frequency of the $n^{th}$ tooth is equal to $f_D+n\Delta$, circuitry for detecting a change in the frequency of the $n^{th}$ tooth and for generating a signal that is proportional to n times the change in an acceleration gradient $\delta a(t)$.

14. The apparatus of claim 13 wherein the value of n is greater than 1 and wherein the circuitry for detecting a change in the frequency of the $n^{th}$ tooth included a phase locked loop which generates the signal that is proportional to n times the change in an acceleration gradient $\delta a(t)$.

15. The apparatus of claim 14 wherein the apparatus, in use, is subjected to a common mode signal that shifts both $f_D$ and $f\Theta$, but where a difference between $f_D$ and $f\Theta$ remains the same, said common mode signal being removed by an additional resonator in an additional phase locked loop in said apparatus, the additional resonator and the additional phase locked loop by detecting and subtracting out the shift caused by the common mode signal.

16. The apparatus of claim 13 wherein the resonators are electromechanical type resonators having quartz resonating structures and are preferably of a UHF type resonator each having a Q of at least $10^5$.

17. The apparatus of claim 13 wherein the resonators are electromechanical, MEMS type quartz resonators.

18. A gravity gradiometer for detecting a gravity gradient, the gradiometer comprising at least two resonators and at least two proof masses, the at least two proof masses each being attached to one or both of said at least two resonators, a first one of said at least two resonators generating a drive signal at a frequency $f_D$, a second one of said at least two resonators having a resonant mode at a frequency $f\Theta$, and, in use, generating a comb of frequencies in response to the magnitude and frequency $f_D$ of the drive signal, the comb of frequencies having teeth separated by a frequency difference $\Delta$, the frequency difference $\Delta$ being essentially equal to a frequency difference between $f\Theta$ and $f_D$.

19. The gravity gradiometer of claim 18 wherein the frequency difference between $f\Theta$, and $f_D$ is related to said gravity gradient, and wherein a sensitivity of detecting said gravity gradient is enhanced by selecting an $n^{th}$ tooth in said comb of frequencies, where n is greater than one, the $n^{th}$ tooth having a frequency equal to $f_D \pm n\Delta$, circuitry for subtracting out a common mode frequency change $\delta f_D$ from the change in the frequency of the tooth so that an absolute value of a resulting frequency shift of the $n^{th}$ tooth corresponds to n times the gravity gradient.

\* \* \* \* \*